Nov. 4, 1969  R. CHURCHILL, JR., ET AL  3,476,014
SPEED VARIABLE PISTON AND CYLINDER ARRANGEMENTS
Filed March 31, 1967
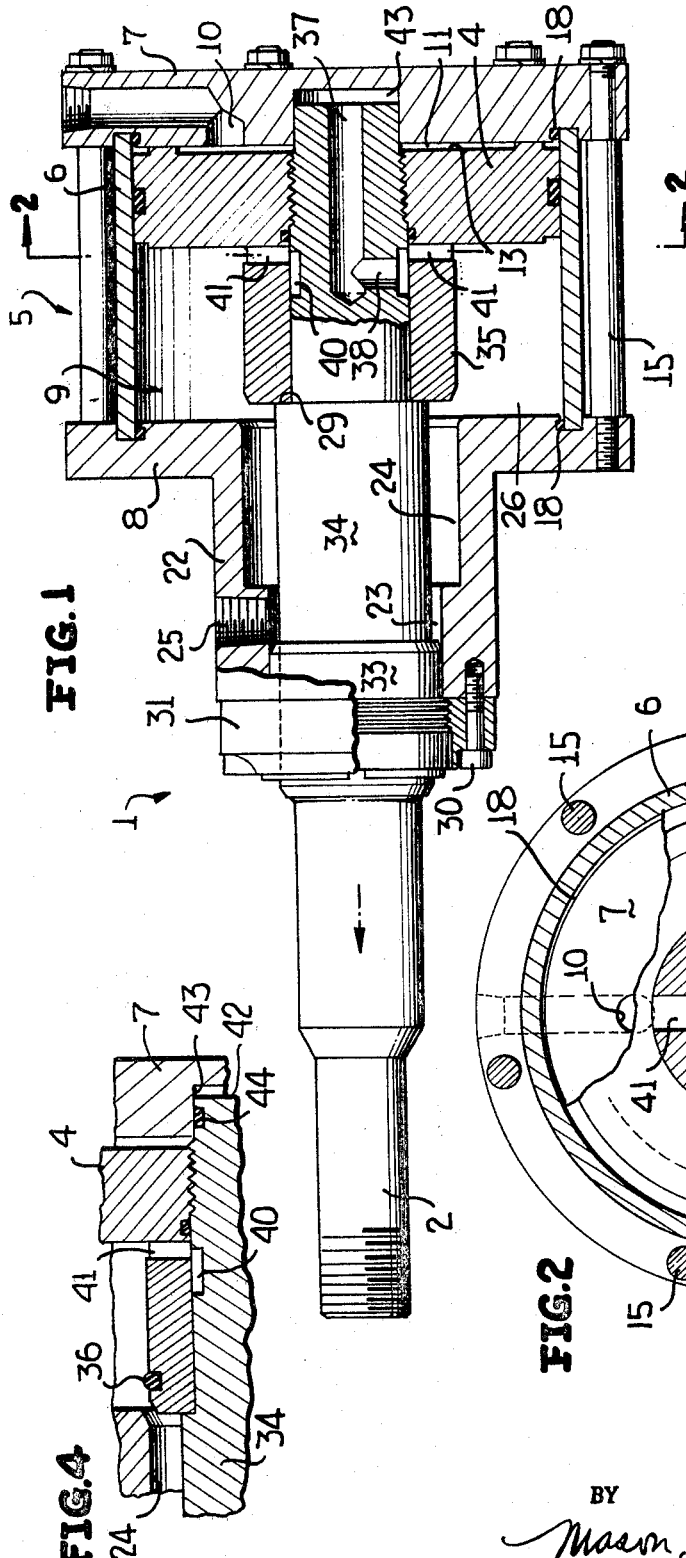
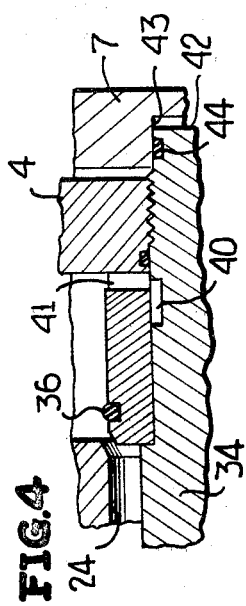
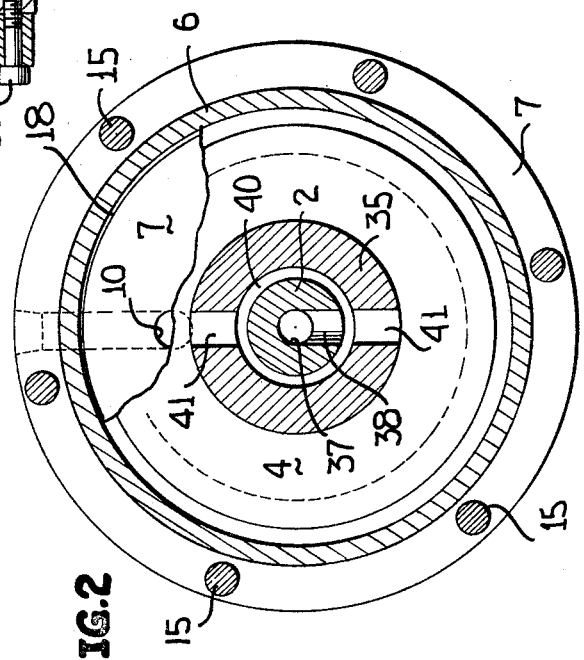
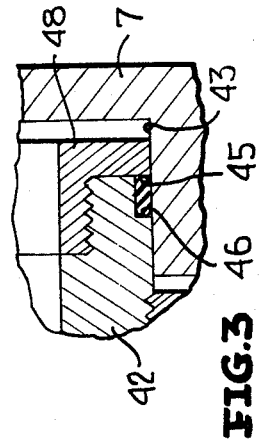
INVENTOR
RALPH CHURCHILL, JR.
HENRY H. FLOCK
BY Mason, Porter, Diller & Brown
ATTORNEY United States Patent Office 3,476,014
Patented Nov. 4, 1969

3,476,014
SPEED VARIABLE PISTON AND CYLINDER
ARRANGEMENTS
Ralph Churchill, Jr., Hoffman Estates, Ill., and Henry H.
Flock, Rochester, N.Y., assignors to Parker-Hannifin
Corp., Cleveland, Ohio, a corporation of Ohio
Filed Mar. 31, 1967, Ser. No. 627,442
Int. Cl. F15b 15/22, 11/08; F16j 1/00
U.S. Cl. 91—394      16 Claims

ABSTRACT OF THE DISCLOSURE

This invention relates to fluid motors of the piston and cylinder type in which a change in piston speed and/or force output is effected at an intermediate position of the piston.

---

An object of this invention is to provide a simple and compact arrangement for a fluid motor of the piston and cylinder type in which the piston imparts high force and slow speed during the first part of its extension stroke and which imparts low force and high speed during the remaining part of such stroke and with a reverse effect during the retracting stroke. Such cylinders may be used, for example, for opening and closing molds or clamping fixtures where only a low force is required to initiate closing, a high force is required for final closing movement and for initial opening movement, and low force may then be used for final opening movement.

The present invention accomplishes the above object by providing a large diameter piston with smaller diameter extensions on each side that alternately cooperate with close fitting cylinder bores to change in midstroke the areas on opposite sides of the piston upon which the motive fluid acts, and with a bypass passage connecting opposite sides of the piston at midstroke to change the differential in the fluid pressures acting upon such areas.

Other objects of the invention will be apparent from the following description and from the drawing in which:

FIG. 1 is a longitudinal sectional view of a preferred form with some parts being in elevation.

FIG. 2 is a vertical cross section taken on the line 2—2 of FIG. 1 and showing a portion of the piston broken away.

FIGS. 3 and 4 are fragmentary longitudinal sectional views showing alternate forms of the invention.

FIG. 1 illustrates a piston and cylinder arrangement 1 having a piston rod 2 fixedly connected to a piston 4 enclosed within a cylinder 5. Cylinder 5 comprises a tube 6 closed at its ends by a cap plate 7 and a head plate 8 defining a cylinder cavity 9 within which piston 4 is disposed. Cavity 9 provides chambers 11 and 26 on opposite sides of piston 4. Cap plate 7 has a port 10 for alternate admission and emission of fluid to and from chamber 11.

Tube 6, cap plate 7 and head plate 8 are held together by tie rods 15 and sealed by packings 18. Head plate 8 includes a cylindrical extension 22 having a bore 23, a counterbore 24 and a port 25 for alternate admission and emission of fluid to and from bore 23 and counterbore 24.

Fastened to extension 22 by bolts 30 is a retainer plate 31. Threaded to retainer plate 31 and closing bore 23 is a gland 33 having an opening through which an enlarged portion 34 of piston rod 2 passes in fluid-tight relationship.

Mounted upon piston rod 2 and clamped against rod shoulder 29 by piston 4, which is threaded onto rod 2 at 39, is a spear or enlargement 35 that is dimensioned to closely fit within counterbore 24 such that when it is moved thereinto flow of fluid between counterbore 24 and chamber 26 is substantially cut off. Thus the outer diameter of spear 35 may be so close a fit within counterbore 24 as to provide an effective seal or the clearance may be such as to permit slight leakage, as desired.

Piston rod 2 has an axial fluid passage 37 communicating with a peripheral groove 40 on the rod via radial passage 38. Spear 35 has radial passages 41 connecting chamber 26 with groove 40. Passage 37 communicates, through a protrusion 42 of rod 2, with a recess 43 in plate 7. Recess 43 receives protrusion 42 in a sliding fit that may be made either close enough to provide an effective seal or may have a slightly looser fit with slight leakage permitted, as desired.

In the alternate arrangement of FIG. 3 protrusion 42 is shown with a rabbet 46 in which is mounted a nonmetallic sleeve 45 that may be either a resilient elastomer or a semi rigid plastic such as a phenolic resin, and that is held in place by a threaded cap 48.

In still another arrangement illustrated in FIG. 4 protrusion 42 and spear 35 may have elastomeric O-rings 44 and 36 mounted thereon for respectively sealing against the cylindrical wall of recess 43 and counterbore 24.

In operation, when piston 4 is in its rightmost position as seen in FIG. 1 and fluid under predetermined pressure is introduced to chamber 11 via passage 10 it acts upon piston 4 on an annular area 13 bounded by the outer diameters of piston 4 and protrusion 42 to move piston 4 to the left toward an extended position. At this time fluid present in chamber 26 is free to pass through counterbore 24, bore 23 and port 25 to the exterior of the device under little or no pressure so that the force for moving piston 4 to the left is substantially equal to the fluid pressure in chamber 11 times area 13. Because chamber 11 is large in diameter area 13 is relatively large and therefore a large force can be developed for moving piston 4 to the left and the speed will be relatively slow.

When piston 4 has moved to the left a predetermined distance, spear 35 enters counterbore 24 and fluid flow from chamber 26 through counterbore 24 and bore 32 to port 25 is either greatly restricted or completely sealed off, depending upon the closeness of the fit between the spear and counterbore 24. Shortly after spear 35 enters bore 20, protrusion 42 emerges from recess 43 to communicate chamber 26 with chamber 11 via passages 41, groove 40 and passages 38 and 37. Piston 4 will now move to the left at a faster speed but with reduced force output. Faster speed occurs because the volume of fluid that has passed from chamber 26 to chamber 11 as just described helps to enlarge chamber 11 faster than if the latter was receiving fluid only through port 10. Less force output occurs because the pressures of the fluid in chambers 26 and 11 are now substantially equalized and the net effective area of piston 4 subject to the predetermined fluid pressure in chamber 11 is the area of the right side of piston 4 bounded by the outer diameter of piston 4 less an area on the left side of piston 4 that comprises the area bounded by the outer diameter of the piston less the outer diameter of spear 35. Because this net effective area is smaller than area 13, less force is transmitted to the rod by piston 4 by the predetermined fluid pressure.

The return stroke of rod 2 and piston 4 is effected by introducing pressure fluid into port 25 and connecting port 10 to exhaust by means of a conventional directional control valve (not shown) in the external fluid circuit. Pressure fluid entering port 25 passes into counterbore 24 to act upon spear 35 on an area bounded by the outer diameter of spear 35 less the diameter of rod portion 34. Because this area is relatively small the retracting or rightward force exerted on the piston and rod is relatively small. As the piston and rod move to the right, some of the fluid being displaced from chamber 11 returns to chamber 26 via passages 37, 38, groove 40 and passages 41 and the remainder is discharged through port 10. Because port 10 is connected to exhaust the pressures in chambers 11 and 26 will be relatively low and substantially equal and because fluid is being transferred from chamber 11 to chamber 26 piston 4 moves rapidly at this time.

As piston 4 approaches end plate 7, protrusion 42 enters bore 43 to close off communication between chambers 26 and 11 and shortly thereafter spear 35 emerges from counterbore 24 to permit pressure fluid from port 25 to enter chamber 26. Pressure fluid now acts on the left side of piston 4 on a larger effective area bounded by the outer diameter of piston 4 and rod portion 34 to move the piston and rod with greater force and, because chamber 26 now receives all its fluid from port 25, with reduced speed. Although it is not essential for most of the uses to which the cylinder may be put to establish a leakproof seal between spear 35 and counterbore 24 and/or between protrusion 42 and the cylindrical wall of recess 43, such seals may be provided as herein indicated through the use of either very close fits or packings such as 45, 44 and 36 will serve to prevent leakage of fluid from port 10 to port 25 or vice versa.

It will be understood that variations may be made in the illustrated embodiment without departing from the scope of the invention as defined by the claims.

We claim:

1. A fluid motor comprising a cylinder having a piston and rod assembly therein dividing the cylinder into two chambers and being movable between retract and extend positions, a port for each chamber for alternately admitting thereto fluid at a predetermined pressure and exhausting spent fluid therefrom whereby the fluid acting upon the piston assembly applies a net force thereto for moving the same between said positions, means for substantially isolating one of said chambers from its port when the piston assembly is in an intermediate position, and means comprising a passage through the piston and rod assembly for connecting said chambers to each other to substantially equalize the pressures therein when said one chamber is isolated from its port to thereby cause a change in the net force applied by the fluid to the piston assembly.

2. The motor of claim 1 in which said isolating means comprises an enlargement upon the rod receivable within a bore between said one chamber and its port.

3. The motor of claim 2 in which said enlargement carries a packing engageable with the cylinder to seal said bore when the piston assembly is toward said extend position.

4. The motor of claim 2 in which the enlargement carries a packing ring engageable with said cylinder about said bore to positively seal said one chamber from its port when the piston assembly is toward said extend position.

5. The motor of claim 1 in which said isolating means becomes effective slightly prior to said connection of the chambers to each other.

6. The motor of claim 1 in which said isolating means includes means for establishing a positive seal between the one chamber and its port when the piston assembly is toward said extend position.

7. The motor of claim 6 in which the positive seal means comprises a packing carried by the piston assembly and engageable with the cylinder between said one chamber and its port.

8. A fluid motor comprising a cylinder having a piston and rod assembly therein dividing the cylinder into two chambers and being movable between retract and extend positions, a port for each chamber for alternately admitting thereto fluid at a predetermined pressure and exhausting spent fluid therefrom whereby the fluid acting upon the piston assembly applies a net force thereto for moving the same between said positions, means for substantially isolating one of said chambers from its port when the piston assembly is in an intermediate position, and means for connecting said chambers to each other to substantially equalize the pressures therein when said one chamber is isolated from its port to thereby cause a change in the net force applied by the fluid to the piston assembly, there also being included a means for increasing the piston area acted upon by the fluid in said other chamber when said chambers become connected.

9. The motor of claim 8 in which said last mentioned means comprises a protrusion on the piston assembly whose end face is substantially sealed from communication with said other chamber when the piston assembly is in the retract position and is exposed to said other chamber in said intermediate position.

10. The motor of claim 9 in which there is a packing between the protrusion and recess wall sealing said recess from said other chamber when the piston assembly is in the retract position.

11. The motor of claim 10 in which said packing is of phenolic resin.

12. A fluid motor comprising a cylinder having a piston and rod assembly therein dividing the cylinder into two chambers and being movable between retract and extend positions, a port for each chamber for alternately admitting thereto fluid at a predetermined pressure and exhausting spent fluid therefrom whereby the fluid acting upon the piston assembly applies a net force thereto for moving the same between said positions, means for substantially isolating one of said chambers from its port when the piston assembly is in an intermediate position, and means for connecting said chambers to each other to substantially equalize the pressures therein when said one chamber is isolated from its port to thereby cause a change in the net force applied by the fluid to the piston assembly, said piston assembly having a protrusion receivable in a cylinder recess that is connected to said other chamber, said protrusion having a passage therein that is connected to said one chamber, said protrusion being received in said recess to block connection of said passage with the one chamber when the piston assembly is in said retract position and being withdrawn from said recess to connect the passage with said other chamber when the piston assembly is in the intermediate position.

13. A fluid motor comprising a cylinder having a piston and rod assembly therein dividing the cylinder into two chambers and being movable between retract and extend positions, a port for each chamber for alternately admitting thereto fluid at a predetermined pressure and exhausting spent fluid therefrom whereby the fluid acting upon the piston assembly applies a net force thereto for moving the same between said positions, means for substantially isolating one of said chambers from its port when the piston assembly is in an intermediate position, and means for connecting said chambers to each other to substantially equalize the pressures therein when said one chamber is isolated from its port to thereby cause a change in the net force applied by the fluid to the piston assembly, said rod passing through the piston and said connecting means comprising passages in the rod.

14. A fluid motor comprising a cylinder having a piston and rod assembly therein dividing the cylinder into two chambers and being movable between retract and extend positions, a port for each chamber for alternately admitting thereto fluid at a predetermined pressure and exhausting spent fluid therefrom, means on each side of the piston assembly for changing the areas thereon subject to pressure of fluid within the respective chambers when the piston assembly is in an intermediate position, and connecting means for equalizing the fluid pressures in said chambers when said piston is between said intermediate and said extend positions, said connecting means comprising a passage through the piston and rod assembly.

15. The motor of claim 14 in which the piston assembly area on one side of the piston that is exposed to fluid in the respective chamber is always larger than the piston assembly area on the other side that is exposed to fluid in its respective chamber.

16. The motor of claim 14 wherein said piston and rod assembly has a protrusion receivable in a cylinder recess that is connected to said other chamber, said protrusion having a passage therein that is connected to said one chamber, said protrusion being received in said recess to block connection of said passage with the one chamber when the piston assembly is in said retract position and being withdrawn from said recess to connect the passage with said other chamber when the piston assembly is in the intermediate position.

References Cited
UNITED STATES PATENTS

| | | | |
|---|---|---|---|
| 2,463,537 | 3/1949 | Hoar et al. | 91—416 |
| 2,746,425 | 5/1956 | Schafer | 91—416 |
| 2,853,974 | 9/1958 | Hewitt | 91—394 |
| 2,994,345 | 8/1961 | Strader | 91—436 |
| 3,175,725 | 3/1965 | Sampson | 91—394 |

PAUL E. MASLOUSKY, Primary Examiner

U.S. Cl. X.R.

91—399, 401, 436; 92—255